United States Patent
Arai et al.

(10) Patent No.: US 6,906,912 B2
(45) Date of Patent: Jun. 14, 2005

(54) SOLID ELECTROLYTIC CAPACITOR AND METHOD OF PRODUCING THE SAME

(75) Inventors: Shinji Arai, Toyama (JP); Masahiko Tanaka, Toyama (JP); Kenji Araki, Toyama (JP)

(73) Assignees: NEC Tokin Corporation, Sendai (JP); NEC Tokin Toyama, Ltd., Toyama (JP)

( * ) Notice: Subject to any disclaimer, the term of this patent is extended or adjusted under 35 U.S.C. 154(b) by 98 days.

(21) Appl. No.: 10/620,084

(22) Filed: Jul. 14, 2003

(65) Prior Publication Data

US 2004/0104450 A1 Jun. 3, 2004

(30) Foreign Application Priority Data

Jul. 15, 2002 (JP) ........................................ 2002-205679

(51) Int. Cl.$^7$ .............................. H01G 9/02; H01G 9/04
(52) U.S. Cl. ...................... 361/525; 361/528; 29/25.03
(58) Field of Search ............................... 361/523–540; 29/25.03

(56) References Cited

U.S. PATENT DOCUMENTS

| | | | | |
|---|---|---|---|---|
| 5,473,503 A | * | 12/1995 | Sakata et al. | 361/525 |
| 5,621,608 A | * | 4/1997 | Arai et al. | 361/525 |
| 6,430,033 B1 | * | 8/2002 | Mitsui et al. | 361/525 |
| 2003/0111247 A1 | | 6/2003 | Araki et al. | |

FOREIGN PATENT DOCUMENTS

JP 2003-163138 A 6/2003

* cited by examiner

*Primary Examiner*—Eric Thomas
(74) *Attorney, Agent, or Firm*—Frishauf, Holtz, Goodman & Chick, P.C.

(57) ABSTRACT

A solid electrolytic capacitor is provided in which non-conductive particles are made to be present between a dielectric layer and an electrolyte layer. A second electrolyte layer is formed of a conductive polymer including graphite particles and non-conductive particles.

19 Claims, 4 Drawing Sheets

SOLID ELECTROLYTIC CAPACITOR AND METHOD OF PRODUCING THE SAME

The present application claims priority to prior application JP 2002-205679, the disclosure of which is incorporated herein by reference.

BACKGROUND OF THE INVENTION

The present invention relates to a solid electrolytic capacitor and a method of producing the same.

An already known solid electrolytic capacitor has a configuration constituted by an anode, a dielectric layer, an electrolyte layer and a cathode, and is generally obtained by forming, on a metal having a valve action (valve-action metal) and constituting an anode, an oxide film as a dielectric layer (hereinafter called a dielectric layer), then forming thereon a solid electrolyte layer as a semiconductor layer and further forming a cathode member of, for example, graphite.

The valve-action metal is a metal capable of forming an oxide film of a controllable thickness by anodizing, and can be Nb, Al, Ta, Ti, Hf, Zr etc., among which Al and Ta are principally utilized for the practical purposes.

Of these, Al is employed as the anode in a form of an etched foil, while Ta is employed as the anode in a form of a porous material formed by powder sintering.

An electrolytic capacitor of the porous sintered type can be with a particularly small size and a large capacity relative to other solid electrolyte capacitors, and is in strong demand as a component capable of enabling reduction in size of a mobile telephone a portable information terminal equipment etc.

For example, a known solid electrolytic capacitor utilizing Ta is obtained by forming a dielectric layer on a surface of an anode member formed by sintering a powder mixture in which a lead wire is embedded, and then forming, on the aforementioned dielectric layer, a conductive polymer layer, containing for example carbon powder, as a solid electrolyte layer.

On the electrolyte layer formed as a semiconductor layer, a graphite paste layer and an Ag paste layer are formed which function as a cathode.

Then lead frames are connected respectively to the lead wire of the anode member and the Ag paste layer, and the entire structure is resin molded so as to expose these lead frames.

In such a known solid electrolytic capacitor, the electrolyte layer includes many cavities, into which conductive particles constituting the cathode member formed on the electrolyte layer penetrate.

Such a phenomenon, when present extensively, provides an advantage of lowering an equivalent serial resistance (ESR) of the solid electrolytic capacitor itself, and also provides an advantageous effect of securing a capacitance even at a high frequency.

However, in case the cathode-constituting material (conductive material) penetrating into the cavities of the electrolyte layer reaches a defect on the dielectric layer, a concentration of an electric field takes place in the area of the defect so as to cause heat generation or crystallization of the dielectric layer, thereby eventually leading to a breakdown of the dielectric layer.

For this reason it has been desired, in a solid electrolytic capacitor, to reduce a leak current by preventing a dielectric breakdown resulting from the deposition of the aforementioned cathode-constituting particles to a defect formed in the dielectric layer, without hindering the penetration of the cathode-constituting particles into the electrolyte layer (hereinafter called a first electrolyte layer).

In order to meet such a requirement, Japanese Patent Application No. 2001-359779 (hereinafter called prior technology 1) proposes a solid electrolytic capacitor including an anode member which is formed by sintering powder of a valve-action metal and in which a lead wire is embedded, a dielectric layer formed on a surface thereof, an electrolyte layer formed on the dielectric layer, a cathode member formed on such first electrolyte layer, and a silver paste layer formed on the cathode member. The solid electrolytic capacitor is completed by respectively connecting external terminals with the lead wire and the silver paste layer, and resin molding the entire configuration so as to expose such external terminals. The electrolyte layer includes particles constituting the cathode member, and non-conductive particles are made to be present between the dielectric layer and the electrolyte layer.

Such prior technology 1 is proposed to solve the aforementioned drawbacks, but is confirmed to elevate the ESR considerably by the aforementioned process and is therefore difficult to apply to a solid electrolytic capacitor requiring a lower ESR property.

SUMMARY OF THE INVENTION

In consideration of the foregoing, it is an object of the present invention to provide a solid electrolytic capacitor capable of suppressing an increase in the ESR which has been a drawback in the prior technology 1, and also capable, without hindering penetration of the particles constituting the cathode into the electrolyte layer, of preventing a dielectric breakdown resulting from a deposition of the cathode-constituting particles to a defect generated in the dielectric layer, thereby reducing a leak current and realizing a satisfactory performance.

It is another object of the invention to provide a method for producing the aforementioned solid electrolytic capacitor.

According to one aspect of the present invention, there is provided a solid electrolytic capacitor which includes a lead wire, an anode member formed by a sintered member of a valve-action metal powder and embedding therein the lead wire, a dielectric layer formed on a surface of the anode member, a first electrolyte layer formed on the dielectric layer, a cathode member formed on the first electrolyte layer, a silver paste layer formed on the cathode member, external terminals respectively connected to the lead wire and the silver paste layer, and a resin package molded so as to expose the external terminals, in which the first electrolyte layer includes particles constituting the cathode member. The solid electrolytic capacitor further comprises non-conductive particles between the dielectric layer and the first electrolyte layer, and a second electrolyte layer formed between the dielectric layer and the cathode member. According to the present invention, the second electrolyte layer is formed after non-conductive particles are made to be present between the dielectric layer and the first electrolyte layer.

According to the present invention, a drawback in the prior technology 1 that the ESR increases since a direct contact between the non-conductive particles and the cathode member causes increase in the electrical resistance at a contact interface of the two, can be avoided by providing an additional electrolyte layer between the non-conductive particles and the cathode member to avoid a contact between the cathode member and the non-conductive particles but to cause a contact between the latter electrolyte layer and the cathode member, and it is also possible to prevent the conductive particles, constituting the cathode member and being present in the electrolyte layer, from contacting in an unnecessary level with the dielectric layer by a thermal expansion or a thermal contraction in a resin molding operation or in a soldering operation, thereby generating a concentration of the electric field. It is consequently possible to prevent a short-circuit defect resulting from a breakdown in the dielectric layer and to improve the product yield without increasing a defect in the ESR.

According to the present invention, it is preferred to position the non-conductive particles in areas constituting recesses in the dielectric layer, and then to form the second electrolyte layer. Such a configuration allows a severe concentration of the electric field generated in areas of an uneven thickness on the dielectric layer to be prevented.

According to the present invention, an area of an uneven thickness means an area having a locally reduced thickness because of an unavoidable situation, such as (i) a contamination of Ta with an impurity, (ii) an uneven current in an anodizing process or (iii) a mechanical stress from the exterior.

Such an area is more likely to cause concentration of the electric field than an area formed with a planned thickness, and prevention of the concentration of the electric field in such an area allows the product yield to be improved, without increasing the ESR.

Also according to the present invention, it is also preferred to position the aforementioned non-conductive particles in such a continuous manner that a distance from an interface between the first electrolyte layer and the dielectric layer to the surface of the anode member is smaller than an average thickness of the first dielectric layer, and then to form the second electrolyte layer. Such configuration allows a severe concentration of the electric field generated in areas of an uneven thickness on the dielectric layer to be prevented, and still allows an increase in the ESR to be prevented.

Also according to the present invention, it is preferred that the non-conductive particles are positioned on the surface of the dielectric layer and in the first electrolyte layer, and the second electrolyte layer is further provided, whereby the cathode member and the non-conductive particles do not come into a direct contact. Such a configuration in the first embodiment prevents a direct deposition of the conductive particles (cathode-constituting particles) in an incomplete area on the surface of the dielectric layer, thereby avoiding a breakdown of the dielectric layer and improving the product yield without increasing an ESR defect.

Also according to the present invention, it is preferred that an average size of the non-conductive particles is smaller than an average size of the particles constituting the cathode member. Such a configuration in the first embodiment allows the non-conductive particles to deposit onto the dielectric layer efficiently.

According to another aspect of the present invention, a method is provided for producing a solid electrolytic capacitor, which includes the steps of sintering a valve-action metal powder while embedding a lead wire therein to form an anode member, forming a dielectric layer on a surface of the anode member, forming a first electrolyte layer on the dielectric layer of the anode member, immersing the anode member having the first electrolyte layer in a colloid solution in which non-conductive colloid particles are dispersed, followed by drying, forming a second electrolyte layer; and forming a cathode member so as to sandwich the first electrolyte layer and the second electrolyte layer with the dielectric layer, then forming a silver paste layer on the cathode member, then connecting external terminals respectively with the lead wire and the silver paste layer and applying a resin mold so as to expose the external terminals. In the aspect of the present invention, it is preferred that the immersion step causes the non-conductive particles to be present between the dielectric layer and the first electrolyte layer.

Such a method allows prevention of concentration of an electric field resulting from contact, in an unnecessary level, of the conductive particles, constituting the cathode member and being present in the electrolyte layer, with the dielectric layer by a thermal expansion or a thermal contraction in a resin molding operation or in a soldering operation. It is thus possible to prevent a shortcircuit defect resulting from a breakdown in the dielectric layer and to improve the product yield without elevating the ESR. According to the present invention, it is preferred that the immersion step causes the non-conductive particles to be present in an area constituting a recess on the surface of the dielectric layer.

Such a method allows a severe concentration of the electric field on the dielectric layer formed with an uneven thickness to be avoided, without an increase in the ESR.

According to the present invention, it is preferred that the immersion step is carried out under a reduced pressure, and causes the non-conductive particles to be present in an area on the surface of the dielectric layer where a distance from an interface between the first electrolyte layer and the dielectric layer to the surface of the anode member is smaller than an average thickness of the dielectric layer.

Such a method allows a severe concentration of the electric field on the dielectric layer formed with an uneven thickness to be avoided, without an increase in the ESR.

According to the present invention, it is preferred that the non-conductive particles have an average size which is smaller than an average size of particles constituting the cathode member.

Also according to the present invention, it is preferred that in at least one of the steps of forming the first and the second electrolyte layers, use is made of at least one of conductive polymers polymerized from at least one of pyrrole, thiophene, and derivatives thereof.

DESCRIPTION OF THE PREFERRED EMBODIMENTS

In order to facilitate understanding of the present invention, description will be made as regards a configuration of a Ta solid electrolytic capacitor by a known technology and a producing method thereof with reference to the accompanying drawings.

Figure 1:
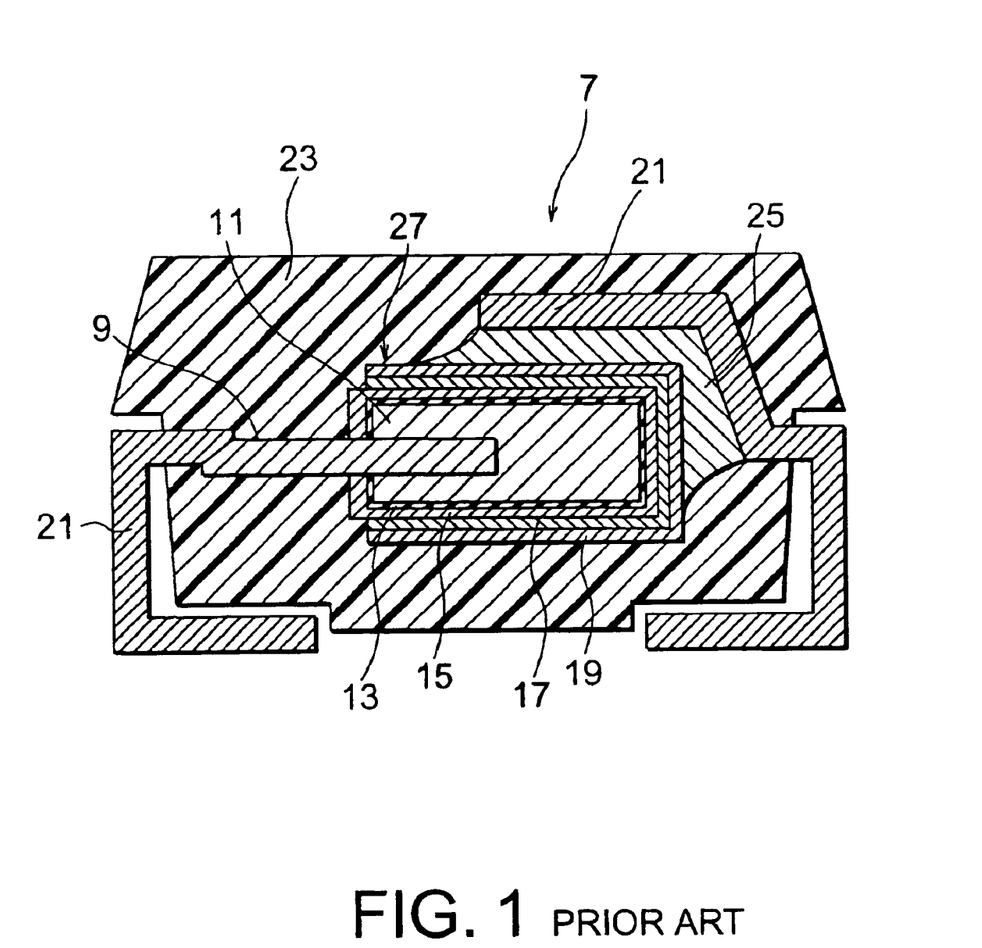
FIG. 1 is a cross-sectional view showing a configuration of a known solid electrolytic capacitor.

As shown in FIG. 1, a known solid electrolytic capacitor 7 utilizing Ta includes a dielectric layer 13 on a surface of an anode member 11 which is formed by sintering a Ta-mixed powder and in which a lead wire 9 is embedded, and a solid electrolyte layer 15 formed by a conductive polymer layer containing carbon powder etc. on the surface of the dielectric layer 13.

On the electrolyte layer 15 formed as a semiconductor layer, a graphite paste layer 17 and an Ag paste layer 19 are formed which serve as a cathode.

Lead frames 21 are connected respectively to the lead wire 9 of the anode member 11 and the Ag paste layer 19, and the entire structure is molded with a resin 23 so as to exposure the lead frames 21.

Figure 2:
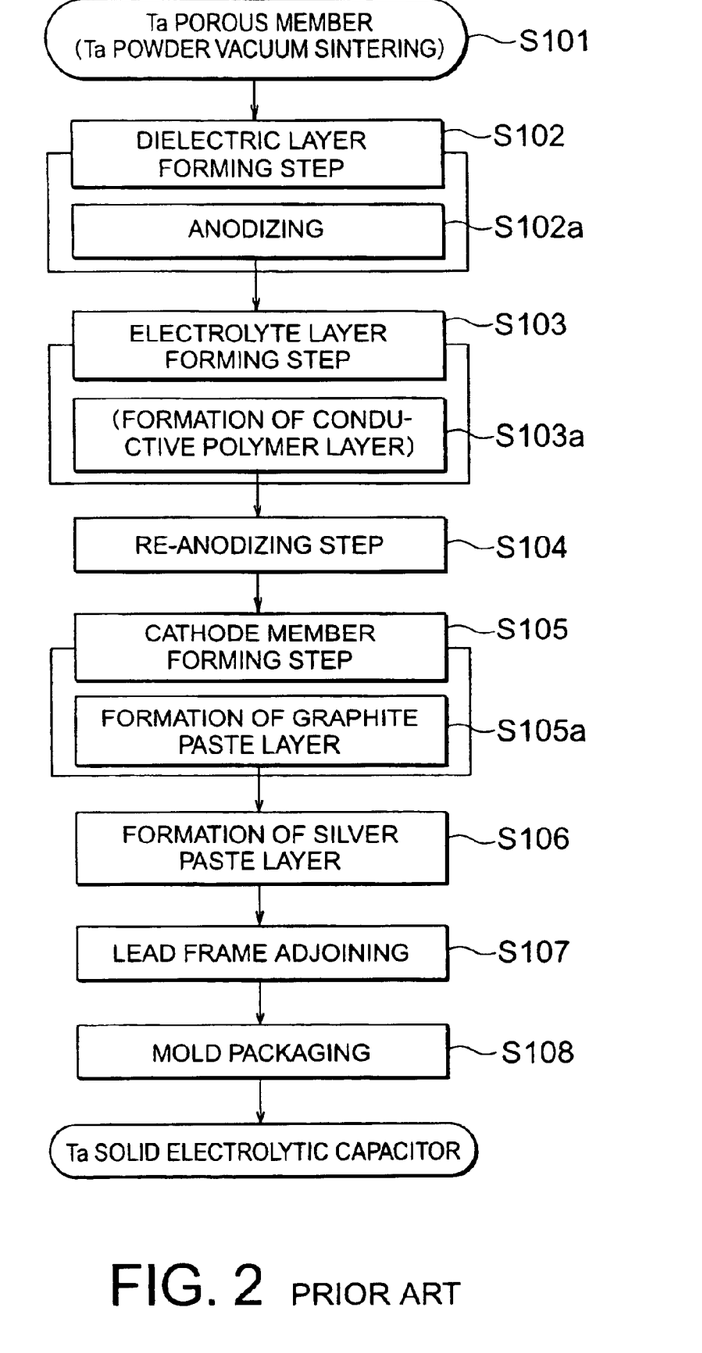
FIG. 2 is a flow chart showing a method of producing a known solid electrolytic capacitor.

Next, a description will be made below, with reference to FIG. 2, as regards a prior method of producing the Ta solid electrolytic capacitor.

As a first step, a Ta porous member is formed (step S101). In this step, (i) preparation of Ta powder, and (ii) pressing and sintering are executed.

In the (i) preparation of Ta powder, a binder is added to and mixed with Ta powder in order to improve a press molding property. In the (ii) pressing and sintering, an anode lead wire is inserted into the aforementioned Ta mixed powder, and such powder is press molded into a cylindrical shape or a rectangular parallelepiped shape. Then, the press molded member is sintered by heating to 1300 to 2000(C under a high vacuum (10-4 Pa or less) to form a Ta porous member or an anode member 11.

In a second step, a dielectric layer 13 is formed (step S102). An anodizing process (step S102a) is executed by immersing the Ta porous member as an anode, together with a counter electrode, in an electrolyte solution such as phosphoric acid and applying an anodizing voltage to form a Ta oxide film constituting a dielectric layer on the surface of the Ta porous member (anodic oxidation). In this operation, an anodizing voltage condition (vf (formation voltage)) determines a thickness of the dielectric layer (Ta oxide film) 13, thereby determining the characteristics of the capacitor. For the electrolyte solution, there is employed for example an aqueous solution of phosphoric acid of a concentration of 0.6 vol. %.

Then, as a third step, an electrolyte layer 15 is formed (step S103). On the oxide film, formed in the preceding step, of the Ta porous member, a solid electrolyte layer is formed as a semiconductor layer (step S103a). As the solid electrolyte, there is employed manganese dioxide, pyrrole, thiophene or a conductive polymer formed by polymerizing derivatives thereof. For example, in the case in which a pyrrole polymer is employed as the solid electrolyte, the solid electrolyte layer can be formed by subjecting the anode member, bearing the dielectric layer on the surface thereof, to a chemical polymerization or an electrolytic polymerization utilizing a monomer solution. Also in the case in which manganese is employed as the solid electrolyte, the solid electrolyte layer can be formed by immersing the anode member, bearing the dielectric layer on the surface thereof, in manganese nitrate, followed by heating.

Then, as a fourth step, a re-anodizing step (step S104) is executed. In the foregoing step for forming the solid electrolyte layer, particularly in the case in which manganese is selected as a component of the solid electrolyte layer, the dielectric layer 13 may be locally damaged by a thermal process executing during such step. In order to repair such a damaged part of the dielectric layer 13, the anode member, on which the dielectric layer 13 and the solid electrolyte layer 15 are formed in succession, is immersed again in the anodizing solution.

Then, as a fifth step, a cathode member 17 is formed (step S105). In this step, a graphite paste layer is formed (step S105a), and a next sixth step executes formation of an Ag paste layer (step S106). More specifically, on the solid electrolyte layer 15, a graphite layer is formed which serves as a cathode member 17, and a silver (Ag) paste layer 19 is further formed thereon.

In the seventh and eighth steps, a lead frame joining (step S107) and a mold packaging (step S108) are respectively executed. More specifically, an anode part of the lead frame is adjoined by spot welding to the lead wire of the anode, and a cathode part of the lead frame 21 is adjoined with a conductive adhesive 25 to the Ag paste layer 19.

Finally, the entire configuration is resin molded as an external package 23, whereby a solid electrolytic capacitor (Ta solid electrolytic capacitor) 7 of a configuration as shown in FIG. 1 is completed.

As shown in FIG. 1, in the prior solid electrolytic capacitor 7, the electrolyte layer 15 has many cavities, in which the conductive particles constituting the cathode member 17, formed on the electrolyte layer 15 are penetrated.

When such a phenomenon is extensive, an advantage of lowering an equivalent serial resistance (ESR) of the solid electrolytic capacitor itself, and also an advantageous effect of securing a capacitance even at a high frequency are provided.

However, if the material (dielectric material) constituting the cathode member 17 and penetrating into the cavities of the electrolyte layer 15 reaches a defective part on the dielectric layer 13, concentration of an electric field takes place in such a defective part to cause heat generation and a crystallization of the dielectric layer 13, thereby eventually leading to a breakdown of the dielectric layer.

Such a defective part on the dielectric layer 13 generally means an area of a thickness significantly different from an initially intended thickness of the dielectric layer, and such part is unavoidable in the current method for producing the solid electrolytic capacitor.

Now, description will be made as regards an embodiment of the solid electrolytic capacitor of the present invention and a producing method thereof with reference to the accompanying drawings.

Figure 3:
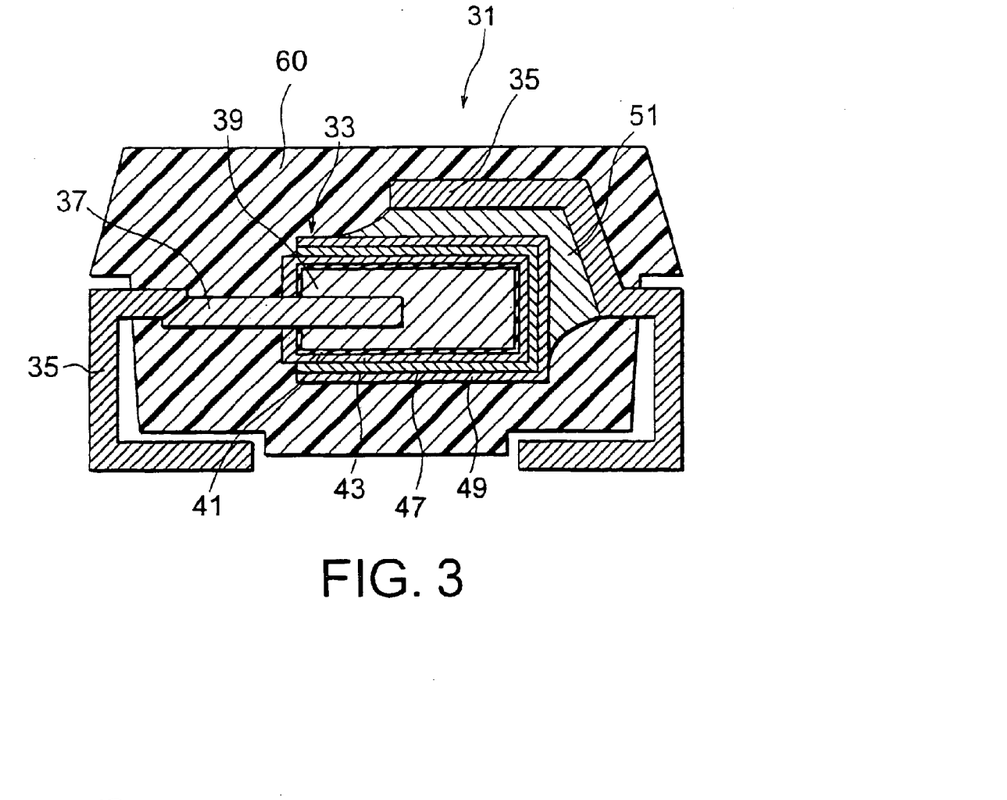
FIG. 3 is a cross-sectional view showing a configuration of a solid electrolytic capacitor of an embodiment of the present invention.

As shown in FIG. 3, the solid electrolytic capacitor 31 of the present invention is constituted by a capacitor element 33, of which an anode part and a cathode part are respectively connected either directly or indirectly to a lead frame 35 and which is sealed in a molding resin 37.

The capacitor element 33 is constituted by forming a dielectric layer 41 on a surface of an anode member 39 formed by sintering a Ta mixture powder in which a lead wire 37 is embedded, and further forming an electrolyte layer (hereinafter first electrolyte layer) 43 and a cathode member 47 on the surface of the dielectric layer 41.

The first electrolyte layer 43 is constituted by a conductive polymer 45 formed on the surface of the dielectric layer 41. Also a graphite paste layer is formed as the cathode member 47 so as to surround the first electrolyte layer 43, and an Ag paste layer 49 is formed on the cathode member 47.

The anode part indicates the lead wire 37 inserted at the formation of the anode member 39. The surface of the lead wire 37 is not subjected to the aforementioned formation of the dielectric layer 41 in order to secure conductivity to the lead frame 35 to be adjoined thereto.

Also the cathode part indicates an outermost shell part (or layer) which is formed by adjoining of the lead frame 35 with the Ag paste layer 49 and which is rendered conductive with the cathode member 47 of the capacitor element 33.

Thus, the lead frame 35 is respectively connected, as an anode terminal and a cathode terminal, to the lead wire 37 constituting the anode part and the Ag paste layer 49 constituting the cathode part.

The lead frame 35 at the cathode terminal and the Ag paste layer 49 are adjoined by a conductive adhesive 51.

Since the anode member 39 is a sintered member, the dielectric layer 41 and the cathode member 43 formed thereon are not formed in a state shown in FIG. 3, which figure merely illustrates the configuration thereof in a schematic manner.

In the following, there will be explained, with reference to FIG. 4, a configuration of the solid electrolytic capacitor of the present invention, particularly that of the capacitor element.

Figure 4:
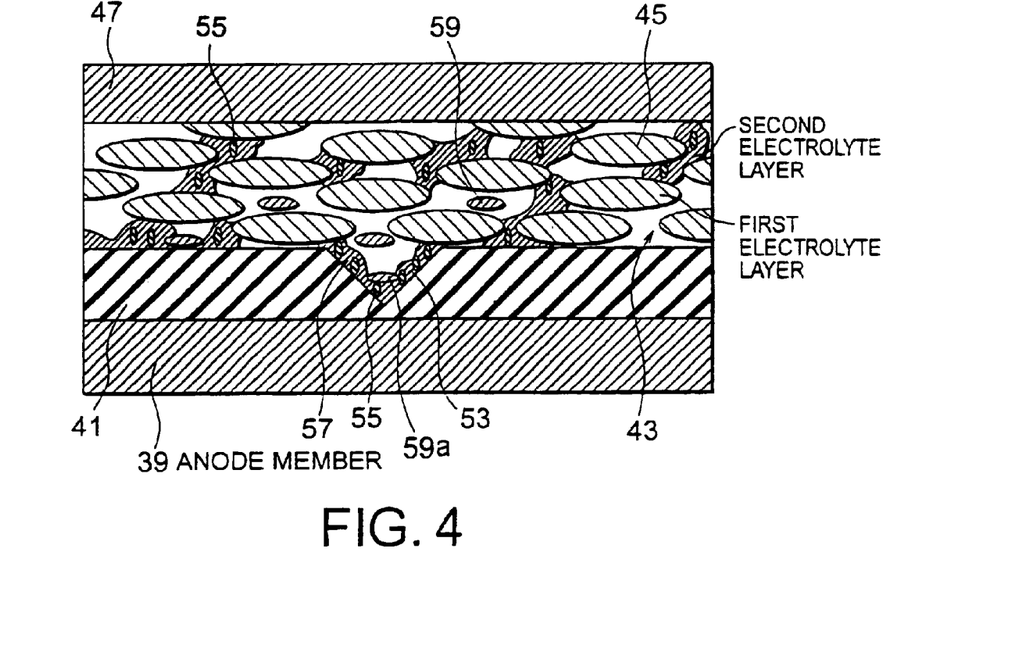
FIG. 4 is a partial cross-sectional view schematically showing a configuration of the solid electrolytic capacitor shown in FIG. 3.

FIG. 4 is a cross-sectional view of the capacitor element in the solid electrolytic capacitor shown in FIG. 3. Referring to FIG. 4, the capacitor element 33 of the solid electrolytic capacitor of the present invention is constituted by an anode member 39 having a plurality of irregularities on the surface and in the interior, a dielectric layer 41 formed on the surface of the anode member 39, a first electrolyte layer 43 formed on the surface of such dielectric layer 41, a cathode member 47 (graphite paste layer) so as to surround these components, and an Ag paste layer 49.

The first electrolyte layer 43 is formed by a conductive polymer 45, formed so as to be filled on the surface and in the cavities of the dielectric layer 41.

In order to achieve a further enhancement in the conductivity of the first electrolyte layer 43 composed of the conductive polymer 45, it is possible to add powder of SnO2 or ZnO, inorganic particles (TiO2, BaSO4 etc.) covered with such substances, or a carbon-based conductive filler such as carbon black, graphite or carbon fibers.

An amount of addition of such additive is not particularly limited, but is preferably 4000 parts by weight or less with respect to 100 parts by weight of the conductive polymer. An amount exceeding 4000 parts by weight may increase a viscosity of the conductive layer, thus eventually resulting in an uneven coating.

Also in the first electrolyte layer 43, there are formed many cavities, and the conductive particles, such as graphite particles, are present in an appropriate amount in such cavities so as to cause the first electrolyte layer to function as a semiconductor layer and also serving to reduce the ESR.

In the solid electrolytic capacitor of the invention, the graphite particles 59 are deposited in an area 53 where a surface of the dielectric layer 41 (at the side of the first electrolyte layer 43) is recessed, namely where a thickness is significantly smaller than an average thickness of the dielectric layer 41, across the aforementioned non-conductive particles 55 and the conductive polymer 57 formed so as to surround the non-conductive particles 55.

Such a configuration is one in which, among the graphite particles 59 present in the first electrolyte layer 43, some of the graphite particles 59a present in the recess 53 on the surface of the dielectric layer 41 are prevented from contacting the dielectric layer 41, and the concentration of the electric field can be avoided by a fact that the non-conductive particles 55 and the conductive polymer 57 formed so as to surround the non-conductive particles 55 prevent the contact of the graphite particles 59a with the dielectric layer 41, while the contact resistance does not increase because of the contact between the conductive polymer 57 with the graphite particles 59a.

The above-mentioned conductive polymer 57 means a conductive polymer obtained, by forming an additional electrolyte layer (hereinafter called second electrolyte layer) after positioning the non-conductive particles 55.

Also in order to avoid as far as possible a contact of the graphite particles 59 in the second electrolyte layer with the dielectric layer 41, the size of the graphite particles 59 is made larger than the size of the non-conductive particles 55.

Next, there will be explained below, with reference to the accompanying drawings, a method for producing a solid electrolytic capacitor constituting an embodiment of the present invention.

In the description of the embodiments of the present invention, concentration of a solution is represented in a percentage by volume unless otherwise specified.

Figure 5:
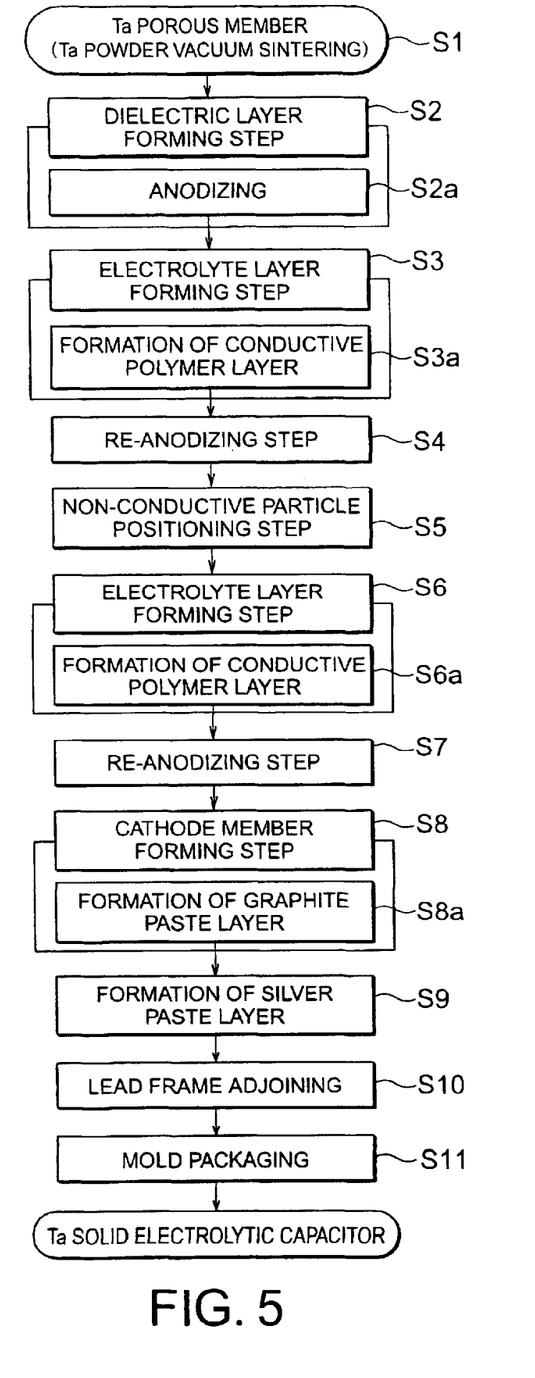
FIG. 5 is a flow chart showing a method for producing a solid electrolytic capacitor of an embodiment of the present invention.

First, as shown in FIG. 5, a first step executes formation of a Ta porous member (anode member 39) (step S1). In this step, (i) preparation of Ta powder, and (ii) pressing and sintering are executed.

In the (i) preparation of Ta powder, a binder is added to and mixed with Ta powder in order to improve a press molding property of the mixed powder with respect to the Ta powder. In the (ii) pressing and sintering, an anode lead wire is inserted into the aforementioned Ta mixed powder, and such powder is press molded into a cylindrical shape or a rectangular parallelepiped shape. Then, the press molded member is sintered by heating to 1400 to 2000(C under a high vacuum (10–4 Pa or less) to form a Ta porous member (anode member 39).

In a second step, a dielectric layer 41 is formed (step S2). An anodizing process (step S2a) is executed by immersing the Ta porous member as an anode, together with a counter electrode, in an electrolyte solution such as phosphoric acid and applying an anodizing voltage to form a Ta oxide film constituting a dielectric layer 41 on the surface of the Ta porous member (anodic oxidation). In this operation, an anodizing voltage condition (vf (formation voltage)) determines a thickness of the dielectric layer (Ta oxide film) 43, thereby determining the characteristics of the capacitor. For the electrolyte solution, an aqueous solution of phosphoric acid is employed for example in a concentration of 0.6%. Also in the following description, the anode member 39 bearing thus formed dielectric layer 41 on its surface is explained as an anodized member.

Then, as a third step, a first electrolyte layer 43 is formed (step S3). In the present invention, the first electrolyte layer 43 is constituted by a conductive polymer 45.

First, a conductive polymer layer is formed (step S3a). For forming the first electrolyte layer 43, which is a major component serving as a semiconductor layer in the present invention, a conductive polymer 45 is employed. For such conductive polymer materials, a conductive polymer can be used which is formed by polymerizing pyrrole, thiophene or derivatives thereof. Therefore, such a first electrolyte layer 43 is formed, by immersing the anode member in an oxidant, drying and immersing in a monomer solution after the formation of the dielectric layer 41.

Then, as a fourth step, a re-anodizing step (step S4) is executed. This step executes the foregoing anodizing process (step S2a) for the purpose of restoration of the dielectric layer 41.

Then, as a fifth step, a step of positioning the non-conductive particles is executed (step S5). For depositing (positioning) non-conductive particles 61 on the dielectric layer 41, non-conductive particles 55 are prepared as colloid particles and are dispersed in a solvent to obtain a colloid solution. A colloid solution was employed which is constituted by a silica solution with a concentration of 0.1 to 5 wt. %. The anodized member, subjected to the re-anodizing step, is immersed in the thus prepared colloid solution. Thereafter, the immersed anodized member is dried at 100 to 150(C whereby the solvent is evaporated and the non-conductive particles 55 dispersed in the solvent are made to penetrate in the cavities in the first electrolyte layer 43 and in fine structure of the recess 53.

Then, as a sixth step, a second electrolyte layer is formed (step S6). In this step, a conductive polymer layer is formed (step S6a), in a manner similar to the formation of the first electrolyte layer 43 (step S3). The second electrolyte layer is also formed on or in contact with a surface of the first electrolyte layer 43.

Then, as a seventh step, a re-anodizing step is executed (step S7) in a manner similar to the foregoing re-anodizing step (step S4).

Then, as an eighth step, a cathode member 47 is formed (step S8). In this step, a graphite layer is formed (step S8a). More specifically, a cathode member 47 of graphite is formed so as to surround the electrolyte layer 43.

Then, as a ninth step, an Ag paste layer is formed (step S109). More specifically, after the formation of the cathode member 47, an Ag paste layer 49 is formed thereon in order to achieve a satisfactory junction between the cathode member 47 and the cathode terminal.

In a tenth step, a lead frame 35 is adjoined (step S10). More specifically, an anode part of the lead frame 35 is adjoined by spot welding to the lead wire 37 of the anode, and a cathode part of the lead frame 35 is adjoined with a conductive adhesive 51 to the Ag paste layer 49.

Finally, as an eleventh step, a mold packaging is executed (S11). More specifically, the entire configuration is resin molded as an external package 60, whereby a solid electrolytic capacitor (Ta solid electrolytic capacitor) 31 of a configuration as shown in FIG. 3 is completed.

Following Table 1 shows the result of a comparison of an LC defect rate in the course of the production process and an LC defect rate after the molding, between a solid electrolytic capacitor embodying the present invention and a solid electrolytic capacitor obtained by a known production method.

The colloid particles (non-conductive particles) employed in the present invention have an average size (diameter) of $1.0 \times 10^{-9}$ to $1.0 \times 10^{-7}$ m, while the conductive particles (graphite particles) constituting the cathode member have an average size (diameter) of $5.0 \times 10^{-6}$ to $2.0 \times 10^{-5}$ m and the cavities of the electrolyte layer have an average size (diameter) of $1.0 \times 10^{-6}$ to $1.0 \times 10^{-4}$ m.

TABLE 1

| | without processing | with processing | Japanese Patent Appln. No. 2001-359779 |
|---|---|---|---|
| LC defect rate in the process (%) | 5–15 | 0.5–0.9 | 0.5–0.9 |
| LC defect rate after packaging (ppm) | 10–100 | 1 or less | 1 or less |
| ESR defect rate (%) | 1–2 | –2 | 5–10 |

As will be understood from Table 1, the LC defect rate in the course of the production process and after the packaging is significantly lowered while the ESR defect does not increase, by depositing the non-conductive particles in recesses (generally called defects) on the dielectric layer so as to hinder the deposition of the conductive particles and then forming the electrolyte layer again.

As explained in the foregoing, in the solid electrolytic capacitor and the producing method thereof according to the present invention, the non-conductive particles are present at a predetermined concentration between the dielectric layer and the electrolyte layer, particularly between the defective part of the dielectric layer and the electrolyte layer while the electrolyte is present so as to surround such non-conductive particles, whereby the conductive particles constituting the cathode member can be prevented from depositing on such defective part without an increase in the ESR.

Thus, the present invention provides a solid electrolytic capacitor and a producing method therefor, capable of preventing concentration of an electric field resulting from a direct deposition of a conductive material such as the conductive particles directly onto the defective part, thereby avoiding a breakdown in the dielectric layer.

What is claimed is:

1. A solid electrolytic capacitor comprising:
   a lead wire;
   an anode member by comprising a sintered member of a valve-action metal powder having the lead wire embedded therein;
   a dielectric layer formed on a surface of the anode member;
   a first electrolyte element in an electrolyte layer formed on the dielectric layer and defining a plurality of cavities;
   non-conductive particles dispersed in the cavities defined by the first electrolyte element;
   a second electrolyte element provided in the electrolyte layer so as to surround the non-conductive particles;
   a cathode member formed on the first electrolyte layer such that particles of a material of the cathode member are dispersed in the electrolyte layer;
   a silver paste layer formed on the cathode member;
   external terminals respectively connected to the lead wire and the silver paste layer; and
   a resin package molded so as to expose the external terminals.

2. The solid electrolytic capacitor according to claim 1, wherein said non-conductive particles have an average size which is smaller than an average size of the particles of the material of said cathode member.

3. The solid electrolytic capacitor according to claim 1, wherein said valve action metal is one of Nb, Al, Ta, Ti, Hf and Zr.

4. The solid electrolytic capacitor according to claim 1, wherein said first electrolyte element includes at least one of a conductive polymer formed by polymerizing pyrrole and a conductive polymer formed by polymerizing thiophene.

5. The solid electrolytic capacitor according to claim 4, wherein said electrolyte layer includes a conductive powder comprising at least one of $SnO_2$ powder, ZnO powder, and a carbon-based conductive filler comprising at least one of carbon black, graphite and carbon fibers.

6. The solid electrolytic capacitor according to claim 5, wherein said conductive powder comprises the at least one of the $SnO_2$ powder and the ZnO powder covering at least one of $TiO_2$ and a $BaSO_4$.

7. The solid electrolytic capacitor according to claim 4, wherein said electrolyte layer includes a carbon-based conductive filler comprising at least one of carbon black, graphite and carbon fibers.

8. The solid electrolytic capacitor according to claim 1, wherein said second electrolyte element comprises a conductive polymer which surrounds the non-conductive particles, and wherein said second electrolyte element is provided between (i) a surface of at least one of said dielectric layer and said cathode member, and (ii) the particles of the material of the cathode member which are dispersed in the electrolyte layer.

9. A The solid electrolytic capacitor according to claim 1, wherein said cathode member comprises graphite.

10. A solid electrolytic capacitor comprising:
a lead wire;
an anode member comprising a sintered member of a valve-action metal powder having the lead wire embedded therein;
a dielectric layer formed on a surface of the anode member;
a first electrolyte element in an electrolyte layer formed on the dielectric layer and defining a plurality of cavities;
non-conductive particles dispersed in the cavities defined by the first electrolyte element;
a second electrolyte element provided in the electrolyte layer so as to surround the non-conductive particles;
a cathode member formed on the electrolyte layer such that particles of a material of the cathode member are dispersed in the electrolyte layer;
a silver paste layer formed on the cathode member; and
external terminals respectively connected to the lead wire and the silver paste layer;
wherein the non-conductive particles are also positioned in an area defined by a recess in the dielectric layer, and said second electrolyte element is provided in the electrolyte layer after said non-conductive particles are positioned in the area defined by the recess in said dielectric layer.

11. The solid electrolytic capacitor according to claim 10, wherein said non-conductive particles are also positioned on a surface of said dielectric layer, and said second electrolyte element is provided so as to prevent said cathode member from contacting said non-conductive particles.

12. A solid electrolytic capacitor comprising:
a lead wire;
an anode member comprising a sintered member of a valve-action metal powder having the lead wire embedded therein;
a dielectric layer formed on a surface of the anode member;
a first electrolyte element in an electrolyte layer formed on the dielectric layer and defining a plurality of cavities;
non-conductive particles dispersed in the cavities defined by the first electrolyte element;
a second electrolyte element provided in the electrolyte layer so as to surround the non-conductive particles;
a cathode member formed on the electrolyte layer such that particles of a material of the cathode member are dispersed in the electrolyte layer;
a silver paste layer formed on the cathode member; and
external terminals respectively connected to the lead wire and the silver paste layer;
wherein said second electrolyte element is provided in the electrolyte layer after said non-conductive particles are positioned; and
wherein a distance from an interface between said electrolyte layer and said dielectric layer to a surface of said anode member is smaller than an average thickness of said electrolyte layer.

13. The solid electrolytic capacitor according to claim 12, wherein said non-conductive particles are also positioned on a surface of said dielectric layer, and said second electrolyte element is provided so as to prevent said cathode member from contacting said non-conductive particles.

14. A method of producing a solid electrolytic capacitor, said method comprising:
sintering a valve-action metal powder while embedding a lead wire therein to form an anode member;
forming a dielectric layer on a surface of said anode member;
forming an electrolyte layer, including a first electrolyte element, on said dielectric layer of said anode member;
immersing said anode member having the electrolyte layer formed thereon in a colloid solution in which non-conductive colloid particles are dispersed, and then drying said anode member;
providing a second electrolyte element in the electrolyte layer;
forming a cathode member so as to sandwich said electrolyte layer between said cathode layer and said dielectric layer,
forming a silver paste layer on said cathode member, and
connecting external terminals respectively with said lead wire and said silver paste layer and applying a resin mold so as to expose said external terminals.

15. The method according to claim 14, wherein said immersion of the anode member in the colloid solution causes the non-conductive particles to be present between said dielectric layer and said first electrolyte element.

16. The method according to claim 14, wherein said immersion of the anode member in the colloid solution causes the non-conductive particles to be present in an area defined by a recess on a surface of said dielectric layer.

17. The method according to claim 14, wherein said immersion is carried out under a pressure such that the non-conductive particles are present in an area on a surface of said dielectric layer where a distance from an interface between said first electrolyte layer and said dielectric layer to a surface of said anode member is smaller than an average thickness of said dielectric layer.

18. The method according to claim 14, wherein said non-conductive particles have an average size which is smaller than an average size of particles of a material of said cathode member.

19. The method according to claim 14, wherein at least one of said first electrolyte element and said second electrolyte element comprise at least one of a conductive polymer polymerized from pyrrole, and a conductive polymer polymerized from thiophene.

* * * * *